Patented Aug. 6, 1940

2,210,305

UNITED STATES PATENT OFFICE 2,210,305

ACETYLATED OIL AND METHOD OF MAKING SAME

Alfred E. Rheineck, Louisville, Ky., assignor to Devoe & Raynolds Co., Inc., a corporation of New York No Drawing. Application November 22, 1938, Serial No. 241,759

8 Claims. (Cl. 260—405)

My invention relates to acetylated oils, and more particularly to a process for acetylating oiticica oil and similar oils to make them useful in varnishes and other protective coatings.

Raw oiticica oil, both in the lard-like or semi-solid form and in the liquid form, produces upon drying, films that are wrinkled and frosted. Because of this characteristic, oiticica oil has been of little value to the protective coating industry. Special cooking treatments of this oil by varnish makers heretofore have helped to some extent but have not substantially overcome these difficulties, and the varnishes using such oil are inferior to the varnishes using the well known China-wood oil. For example, when oiticica oil is substituted for China-wood oil in a varnish, the varnish has poor outside durability and has substantially diminished water and alkali resistance.

In accordance with the present invention, I have discovered that the above objectionable properties of oiticica and similar oils may be overcome by acetylation of the oil, that is introducing the acetyl radical, $CH_3CO-$ into the organic oil molecule. The acetylated oil will not wrinkle or frost upon drying and its properties in general are so improved that the oil may be substituted satisfactorily for China-wood oil in varnishes. The resulting varnish is not only as good as China-wood oil varnish but in fact better in many respects. In the varnish using my acetylated oiticica oil, the water and alkali resistance, the hardness and the drying rate of the varnish are all substantially improved.

I have discovered that when oiticica oil is acetylated that it will dry into a smooth, tough and glossy film in about 15 minutes time without the use of any drier. This improved oiticica oil may be prepared by reacting the raw oiticica oil with an excess of acetylating agent, and with or without the addition of a small amount of sodium acetate. I have found it advantageous to carry out the acetylation by refluxing the oil with acetic anhydride, but I do not limit my invention thereto since other suitable known acetylating agents that will accomplish the purposes of this invention may be used. This acetylation process when carried out by refluxing of the oil with the acetylating agent may be effected either at atmospheric pressures or at higher pressures. The higher pressures substantially increase the degree or rate of acetylation due to the increased temperature when the reaction is conducted in a closed system, for example, a sealed Pyrex tube or a stainless-steel autoclave. The degree of acetylation of the oiticica oil seems to be controlled by a mass action type of reaction which is dependent upon the concentration of the reactants and the time and temperature of treatment. Varying these reaction conditions produces oils of substantially different acetyl numbers as is indicated by the following table in which the oiticica oil used was obtained from the 1935 crop of oiticica oil. Variations in temperature, particularly, produce marked variation in the degree of acetylation.

| Oil | Reactants | | Conditions | | |
|---|---|---|---|---|---|
| | Acetic anhydride | Sodium acetate | Temperature | Time | Acetyl No. of the finished oil |
| Parts | Parts | Parts | °C. | Hours | |
| 150 | 50 | 5 | 150 | 3 | 16.8 |
| 150 | 50 | 5 | 220 | 1 | 27.3 |
| 150 | 15 | 5 | 225 | 4 | 27.3 |
| 150 | 75 | 5 | 225 | 3 | 38.9 |
| 150 | 25 | 5 | 220 | 3 | 23.8 |
| 150 | 150 | 5 | 200 | 5 | 38.3 |

I have found that there is a direct relationship between the drying properties and other characteristics of the acetylated oil and the acetyl number of the oil. For example, the oil shown in the above table having an acetyl number of 38.9 is substantially better as a varnish oil than the oil produced from the same source and having an acetyl number of 16.8. While the acetyl number of the oil may be varied widely and satisfactory results still produced, I have found it advantageous to acetylate the oil to such an extent that it will have an acetyl number of about 25 or higher. It is to be understood, however, that oils having lower acetyl numbers, such as for example the above acetyl number 16.8, are satisfactory for a number of purposes. In general, the greater the acetylation the greater the improvement in the oil, so that there is no controlling maximum limit below complete acetylation. Likewise there is no controlling lower limit since any appreciable amount of acetylation will produce an improvement in the drying and other characteristics of the oil. In producing the various degrees of acetylation in the oil the acetylating reaction conditions and concentrations of the reactants may be varied over a wide range, and as suggested, at least some of the benefits of the invention obtained from the extreme lower limits of this range.

In the usual case, I have found it advantageous to prepare the acetylated oil by a procedure in which approximately 150 parts of the oil are treated with between 15 and 75 parts of acetic anhydride and approximately 5 parts of anhydrous sodium acetate. Depending upon the acetyl number and the time of reaction desired, the temperature in this example might be varied from approximately 200° C. to 230° C. and the acetylation treatment carried out for about 1 to 5 hours. In most cases full acetylation is desired and theoretically this requires 4 parts of acetic anhydride to each 15 parts of oiticica oil, which is based upon a ratio of one mol of acetic anhydride to each licanic acid radical in the oiticica oil. In practice it is of advantage to use an excess of the acetylating agent, e. g. acetic anhydride.

While my invention is herein described with particular reference to oiticica oil, I also intend to include within the scope of this invention, other similar oils which will respond to this acetylation treatment and which will produce the desired properties in the acetylated oil. One of the reasons for preferring oiticica oil is because of its commercial availability and because of the fact that it would serve as a good substitute for China-wood oil provided its properties were changed, as indicated above, by the acetylation treatment. Another example of a similar oil which I have tried and found to be satisfactory for use in my process is po-yoak oil, which is obtained from *Afrolicania elaeosperma*. The properties of this oil resemble more or less the average properties of oiticica oil and China-wood oil.

Oiticica oil is a fatty oil and contains in a predominant amount, esters of licanic acid. These fatty acid esters have a ketone group and may be termed, esters of a ketone fatty acid. From certain research work that I have done upon po-yoak oil, I have found that it contains a fatty acid isomeric to licanic acid and that this isomeric acid has a ketone group, so that this oil may also be characterized as one containing a ketone fatty acid. While I do not wish to limit my invention to any particular theory I believe that the marked improvement which I have obtained by acetylation of the oiticica and po-yoak oils is due largely to the acetylating action on the above mentioned ketone groups in these oils. More specifically, from the nature of the acetylation reaction and from other evidence which I have observed, it appears to me that the ketone group enolizes to a hydroxyl and that this hydroxyl group is in turn acetylated. The reaction conditions described above for carrying out my process are favorable to this type of transformation. As suggested, I consider that this type of reaction takes place during the acetylation of the oil but I do not wish my invention to be restricted thereto, since other polymerization reactions are entirely possible.

Similarly to oiticica oil, po-yoak oil may be acetylated in accordance with the process described above and when it is so treated it dries in a similar manner to the acetylated oiticica oil. Under the above described advantageous reaction conditions, the acetylated po-yoak oil may be obtained by refluxing with the acetic anhydride and sodium acetate to produce a suitable acetyl value, e. g., about 30, and similarly to the corresponding oiticica oil the acetylated po-yoak oil will dry in about 15 to 20 minutes and form a smooth, glossy and hard film.

The acetylated oils are generally very viscous in their nature. The viscosity as determined by the well-known Gardner-Holdt test will vary usually from about $Z_1$ to $Z_6$, i. e. 47 to 148 poises at 25° C. or higher. The acetylation process bleaches the oils and does not increase the acidity of the oils. These characteristics are of commercial advantage in the use of the acetylated oils in coatings such as varnishes.

The following examples are intended to illustrate the process of my invention without restricting the invention thereto since it is subject to many variations from these specific procedures:

EXAMPLE 1

*Acetylated oiticica oil*

| | Parts by weight |
|---|---|
| Oiticica oil | 30 |
| Acetic anhydride | 10 |
| Anhydrous sodium acetate | 1 |

The above ingredients are mixed and placed in a glass or stainless steel autoclave and heated at a temperature of about 190° C. to 200° C. for four hours. At the end of this period, the unreacted acetic anhydride is removed. This removal may be effected by washing the reaction mixture several times with hot water and the water remaining in the oil may be removed in a variety of ways. For example the water may be removed by treating the mixture with anhydrous sodium sulphate; or, alternatively, the oil mixture may be refluxed with toluene and the water trapped and the solvent returned. Another method of removing the water from the oil is by heating the reacted oil under vacuum.

One application of the acetylated oil of my invention, such as that produced by the above example, is as an oil constituent in varnishes. For example, the acetylated oil may be used in place of China-wood oil in well-known varnishes. An example of a varnish using the oil of my invention is as follows:

EXAMPLE 2

*Acetylated oil varnish*

| | Parts by weight |
|---|---|
| Modified phenolic resin (Extra light Amberol B. S. 1) | 100.0 |
| Litharge | 1.5 |
| Cobalt acetate | .5 |
| Acetylated oiticica oil | 176.0 |
| Bodied perilla oil (visc. $Z_3$) | 20.0 |
| Solvent naphtha | 330.0 |

The preparation of the varnish from the above list of ingredients may be carried out as follows:

The acetylated oiticica oil and resin are first heated together to a temperature of about 285° C. and then the litharge is added. The resulting mixture is then cooled to about 260° C. and the cobalt acetate is added with stirring. Into this mixture is then introduced the bodied perilla oil and solvent naphtha as a thinner. The resulting varnish compares favorably with a good quality China-wood oil varnish and in fact is superior thereto in a number of respects. My varnish, for example, dries faster, is harder and tougher than the good quality China-wood oil varnishes and is at least equal to such varnishes in water resistance.

It will be understood that various modifications and changes may be made in the materials and procedures described herein without departing from the scope of my invention, some of the novel features of which are defined in the appended claims.

What I claim is:

1. A process for treating an oil selected from the group consisting of oiticica oil and po-yoak oil to render the oil suitable for use as a constituent in varnishes and other coatings comprising acetylating the oil until it has the property of drying in a relatively short time and of forming a smooth, tough and glossy film.

2. A process as defined in claim 1, in which the acetylated oil is produced by reacting the oil with acetic anhydride in the proportions of approximately 150 parts of oil to 15 to 75 parts of the acetic anhydride, the reaction temperature being maintained between approximately 200° C. and 230° C. for about 1 to 5 hours.

3. A process as defined in claim 1 in which the acetylating treatment is carried out until the oil is substantially fully acetylated.

4. An acetylated fatty oil that contains a substantial amount of esters of higher fatty acids having a ketone grouping and that has been acetylated sufficiently to cause the oil when filmed to dry in a relatively short time and form a smooth, glossy, hard film which is resistant to water and alkalis.

5. An acetylated oil as defined in claim 4 and which is further characterized by having an acetyl number of at least 16.

6. An acetylated oil as defined in claim 4, in which the oil is selected from the group consisting of oiticica and po-yoak oils.

7. A process of preparing an oil which has the property of drying in a relatively short time and forming a smooth tough hard film comprising heating a fatty oil, which contains a substantial amount of esters of higher fatty acids having a ketone grouping, with an acetylating agent sufficiently to produce the aforesaid properties and removing any excess of unreacted acetylating agent.

8. A process as defined in claim 7 in which any unreacted acetylating agent remaining is removed by washing the reaction mixture with water followed by removing the water.

ALFRED E. RHEINECK.